United States Patent [19]

Youmans

[11] 3,789,217

[45] Jan. 29, 1974

[54] WATER PRODUCTION SYSTEM HAVING MEANS TO SELECTIVELY PROFILE VARY BOREHOLE FLUID FLOW

[75] Inventor: Arthur H. Youmans, Houston, Tex.

[73] Assignee: Dresser Industries, Inc., Dallas, Tex.

[22] Filed: Feb. 10, 1970

[21] Appl. No.: 9,116

Related U.S. Application Data

[63] Continuation of Ser. No. 715,338, March 22, 1968, abandoned.

[52] U.S. Cl. ............................... 250/265, 250/270
[51] Int. Cl. .............................................. G01t 1/16
[58] Field of Search 250/83.6 W, 71.5, 83.3, 435 D, 250/265, 270

[56] References Cited
UNITED STATES PATENTS

| 2,935,615 | 5/1960 | True | 250/83.6 W |
| 3,071,687 | 1/1963 | Youmans | 250/83.1 W |
| 3,084,250 | 3/1963 | Dennis | 250/83.6 W |
| 3,368,195 | 2/1968 | Peterson | 250/83.6 W |

Primary Examiner—James W. Lawrence
Assistant Examiner—Davis L. Willis
Attorney, Agent, or Firm—Eddie E. Scott; John N. Hazelwood

[57] ABSTRACT

This specification discloses a system for obtaining a water production profile of a producing oil well. A logging instrument is used having a deuterium tritium neutron source. A detector is mounted in the tool above the neutron source and an inflatable bag is positioned between the source and this detector. A positive displacement pump, servo-controlled from the surface, is provided to permit precisely determined amounts of liquid to be pumped into the bag from the borehole to thus vary the transit time of the borehole fluid from the source to the detector by a known amount. A second detector is positioned below the neutron source to detect whether any downward circulation in the borehole takes place.

In an alternative embodiment, a pair of detectors are positioned on the same side of the source within the borehole instrument.

10 Claims, 3 Drawing Figures

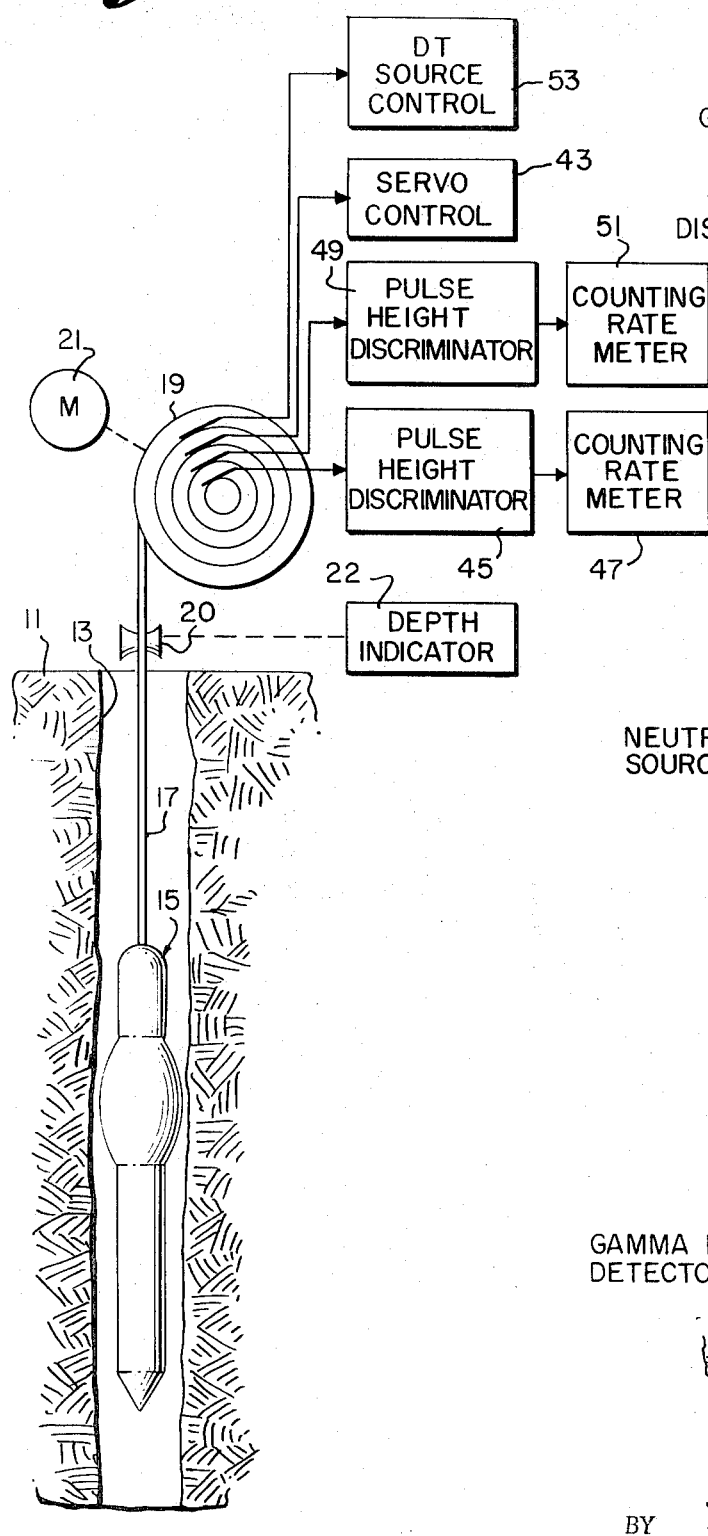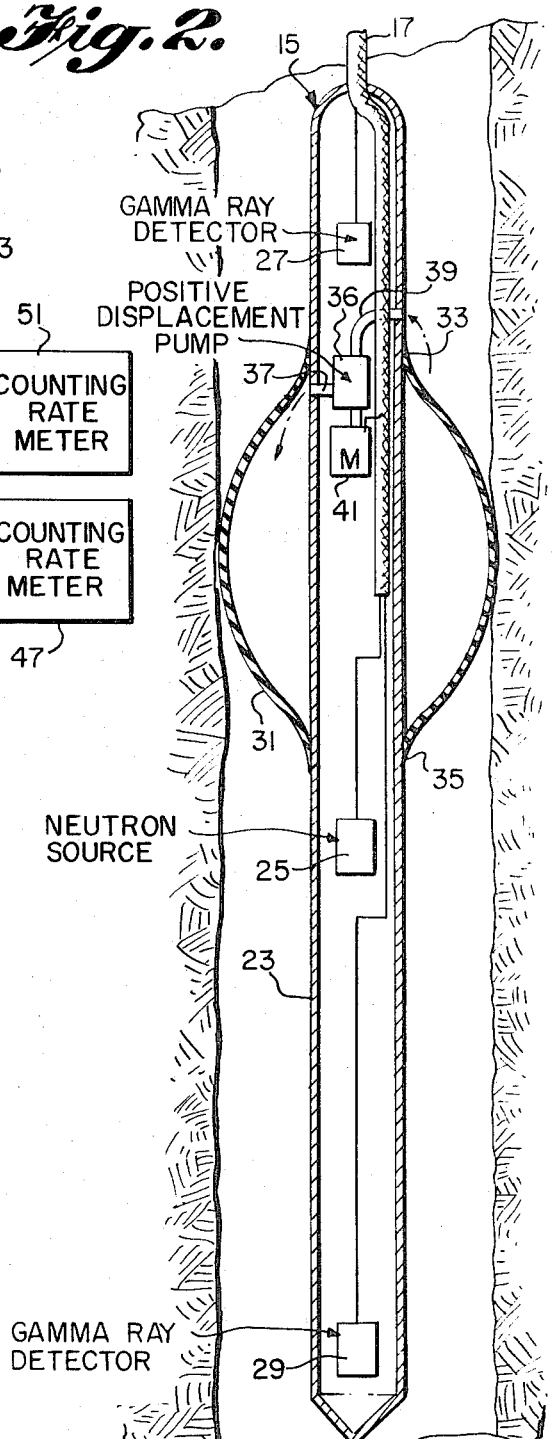
INVENTOR
ARTHUR H. YOUMANS
BY William E. Johnson Jr.
ATTORNEYS

WATER PRODUCTION SYSTEM HAVING MEANS TO SELECTIVELY PROFILE VARY BOREHOLE FLUID FLOW

This application is a continuation of application Ser. No. 715,338 filed Mar. 22, 1968 and now abandoned.

BACKGROUND OF THE INVENTION

This invention relates to measurement of water production in a producing oil well, and more particularly, to a system for making such a measurement utilizing an accelerator type source.

It is often desirable to have from a producing well a water production profile, which is data indicating the amount of water production from each different depth in the well. The water production profile of a producing oil well can be obtained by measuring the linear rate of water flow and the ratio of water to oil and gas at incrementally spaced positions or depths in the well provided the diameter of the borehole at each depth is known. From the water to oil and gas ratio and the borehole diameter, the volume of water per foot of borehole depth can be determined, the remaining volume being taken up by oil and gas. The volumetric flow rate can then be determined by multiplying the volume of water per foot of borehole depth times the linear velocity. The water production from a given depth will be equal to volumetric flow rate at that depth minus the volumetric flow immediately below that depth. Thus, by taking measurements to determine the linear rate of water flow and the ratio of water to oil and gas at incremental depths in the borehole, the water production profile of the well can be determined.

One way of measuring the linear velocity of water in a producing well is by means of oxygen activation. A logging tool is provided with a radioactive neutron source such as a deuterium-tritium source with a detector positioned above the source spaced a suitable distance therefrom. The logging tool is positioned in the borehole at a depth at which the water production profile measurements are to be taken and the neutron source is turned on to activate the oxygen in the fluid surrounding the source in the borehole. The oxygen reacts with the 14 mev neutrons in accordance with the reaction $O^{16}(n,p)N^{16}$. The $N^{16}$ is radioactive with a half life of 7.3 seconds. This radioisotope, which emits gamma rays of about 6 mev energy, is created by "activation" of the oxygen. Accordingly, $N^{16}$ is in this context referred to as "oxygen activation" or "activated oxygen." This activated oxygen, (i.e., Nitrogen 16 will flow to the detector and the amount of oxygen activation is measured by means of the detector. Then after this measurement is taken the neutron souce is turned off and the length of time for all activated oxygen to pass the detector is measured. This operation will provide a measurement of the length of time for the activated oxygen to pass from the neutron source to the detector. Since the spacing between the source and the detector is known, this measurement will provide the linear rate of water flow in the borehole at the depth at which the instrument is positioned. The intensity of detected radiation is proportional to the neutron source strength and to the relative amount of water in the moving fluid column. Thus it is possible to determine both the amount of moving water and its velocity if the borehole diameter is known. When the borehole diameter is unknown, which is often the case, the volumetric flow rate cannot be determined by this means. Since it is the rate of flow in terms of volume which is particularly desired, the prior art is inadequate. The present invention provides a means to accomplish the desired measurement.

SUMMARY OF THE INVENTION

The present invention provides a means to vary the transit time of the borehole fluid from the source to the detector in such a way as to permit quantitative determination of volumetric flow rate. This varying of the transit time is accomplished by means of an inflatable bag positioned on the logging tool between the source and the detector. To reduce the transit time by a specific amount the bag is filled with a precisely known amount of liquid. This operation reduces the volume of the borehole between the source and detector by a known amount and thus shortens the transit time of the fluid from the source to the detector. In this manner, the transit time may be varied to detect oxygen activation at widely different flow rates and the volumetric flow rates may be quantitatively measured in spite of any variations in borehole diameter. By taking the measurements at each different depth in the well, a water production profile of the well will be obtained.

Accordingly, an object of the present invention is to provide an improved system for obtaining a water production profile of a producing oil well.

Another object of the present invention is to provide an improved system for measuring the volumetric flow rate and the ratio of water to gas and oil at a given depth in a producing oil well.

A further object of the present invention is to selectively vary the transit time of fluid in a producing well between a radioactive source and a radiation detector in the oil well.

A still further object of the present invention is to provide a system for obtaining water production profile of a producing oil well with widely varying flow rates.

A still further object of the present invention is to provide an improved logging instrument for obtaining a water production profile.

DESCRIPTION OF THE DRAWINGS

Further objects and advantages of the present invention will become readily apparent as the following detailed description of the invention unfolds and when taken in conjunction with thp drawings, wherein:

FIG. 1 schematically illustrates the system of the present invention;

FIG. 2 schematically illustrates the details of the logging instrument of the present invention.

DETAILED DESCRIPTION OF PREFERRED EMBODIMENTS

Figure 3:
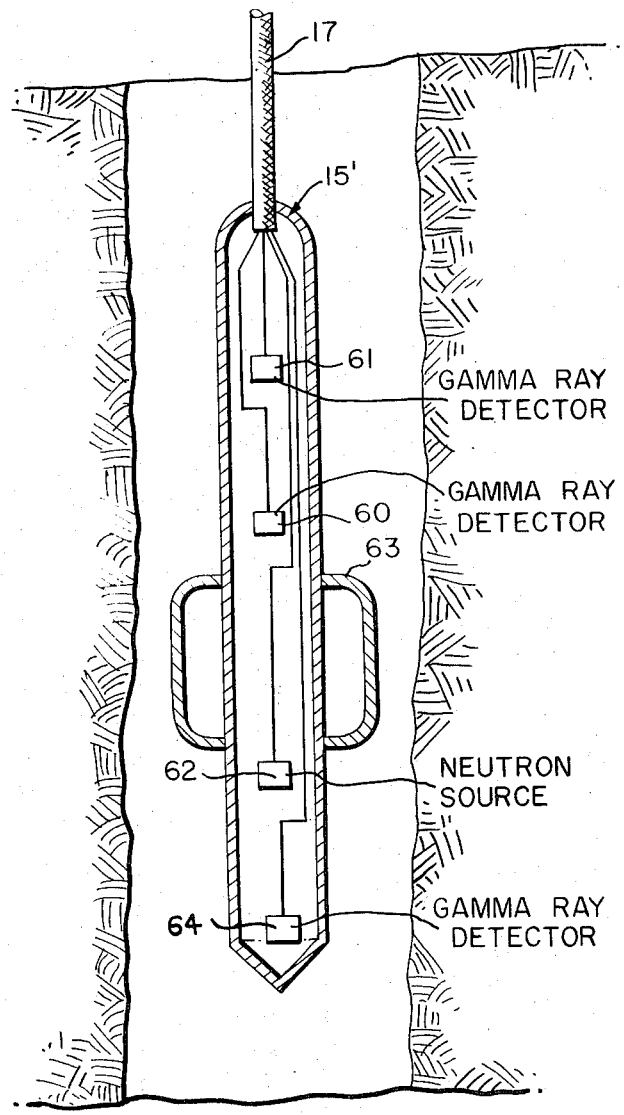
FIG. 3 schematically illustrates the details of an alternative embodiment fo the logging instrument according to the present invention.

In FIG. 1, a portion of the earth's crust 11 is schematically shown in vertical section. A well or borehole 13 penetrates the earth's crust and a logging instrument 15 is disposed within the borehole and is adapted to be moved through the borehole. The instrument 15 is suspended in the borehole by a cable 17 which contains the necessary electrical conductors for connecting the electrical components of the instrument 15 with the surface equipment. The cable 17 is wound on a drum 19 positioned on the surface at the mouth of the borehole. By winding or unwinding the cable on the drum 19, the instrument can be raised or lowered in the borehole. A motor 21 is provided to drive the drum 19 to raise or lower the instrument. The cable 17 is drawn over a measuring reel 20 which rotates as the instrument 15 is raised or lowered in the borehole. The amount and direction of rotation of the measuring reel 20 is detected by a depth indicator 22 to provide an indication of the depth at which the instrument 15 is located.

As shown in FIG. 2, which schematically illustrates the logging instrument 15 in section, the logging instrument 15 comprises a casing 23, in which a neutron source 25 is mounted. The source 25 is preferably a deuterium tritium or "D-T" neutron source, which produces 14 mev neutron radiation. A "D-T" source is disclosed in U.S. Pat. No. 2,689,918 to A. H. Youmans. Spaced above the neturon source 25 within the casing 23, there is mounted a gamma ray detector 27, which produces output pulses having amplitudes corresponding to the energy levels of incident gamma rays. The gamma ray detector 27 is spaced at least 4 to 6 feet from the neutron source 25 so that the detector 27 will not detect gamma rays resulting from instantaneous reactions of the borehole formation minerals with neutrons from the source 25. Spaced 4 to 6 feet below the source 25, there is mounted within the casing a second gamma ray detector 29, which also produces output pulses having amplitudes corresponding to the energy levels of the incident gamma rays. The gamma ray detectors 27 and 29 may be scintillation detectors such as those used in the nuclear well logging system disclosed in the U.S. Pat. No. 3,257,557 to A. H. Youmans.

Surrounding the instrument casing 23 between the detector 27 and the source 25 is an inflatable bag 31 which is sealed with a fluid tight seal to the casing 23 at locations 33 and 35. A positive displacement pump 36 is mounted within the casing 23 having a conduit 37 opening into the interior of the inflatable bag 31 through the wall of the casing 23 and having a conduit 39 opening into the borehole through the wall of the casing 23 outside the inflatable bag 31. The positive displacement pump 36 is driven by a motor 41, which is controlled by means of a servo-mechanism having a control 43 on the surface connected to the motor 41 through the cable 17.

The positive displacement pump 36 is operated by the motor 41 to pump liquid from the borehole through the conduit 39 and the conduit 37 into the inflatable bag 31. By means of the servo-control 43, the amount of rotation of the motor 41 is precisely controlled from the surface and accordingly the amount of liquid which is pumped into the inflatable bag 31 by the positive displacement pump 36 is precisely predetermined and measured from the surface.

The pulses produced by the detector 27 in response to gamma radiation pass through an electrical conductor in the cable 17 to a pulse height discriminator 45. The amplitudes of the pulses produced by the detector 27 as pointed out above are proportional to the energy of the respective gamma rays detected. Oxygen contained in the borehole fluids, when irradiated by 14 mev neutrons is "activated", that is, it is made radioactive. This is due to the reaction $O^{16}(n,p)N^{16}$ wherein the $N^{16}$ is radioactive with a half life of 7.3 seconds and emits gamma rays with an energy of about 6 mev. This activated oxygen can be unambiguously detected by detecting the 6 mev radiation. The pulse height discriminator is set to pass pulses having an amplitude indicative of pulses produced by the detector in response to gamma rays at the 6 mev level. Pulses with substantially smaller amplitudes are blocked by the discriminator. The pulses corresponding to the 6 mev gamma radiation are applied to a counting rate meter 47 which produces an indication of the rate at which the pulses are being produced and thus provides an indication of the intensity of gamma radiation due to activated oxygen in the neighborhood of the detector 27.

The pulses produced by the detector 29 are also passed up through the cable 17 to a pulse height discriminator 49, which is also set to pass pulses produced in response to 6 mev gamma radiation. These pulses are applied to count rate meter 51 which will provide an indication of the value of oxygen activation at the detector 29.

In operation, the drum 19 is rotated by means of the motor 21 to position the logging instrument 15 at a depth at which the measurements are to be taken. The neutron source 25 is turned on by means of a control 53 on the surface connected to the source 25 through the cable 17. In a producing well, fluid in the borehole will be flowing upward toward the surface. The neutrons radiated from the source 25 will activate some of the oxygen in the fluid flowing past the source 25 by the reaction $O^{16}(n,p)N^{16}$.

The activated fluid, carrying with it the radioactive $N^{16}$ will emit gamma rays at the 6 mev energy level and when this activated fluid reaches the neighborhood of the detector, this gamma radiation will be detected, thereby causing the detector 27 to produce output pulses having amplitudes corresponding to the energy levels of the incident gamma rays. These pulses will then be applied to the pulse height discriminator 45, which will pass only the pulses of amplitudes corresponding to the 6 mev energy level. The pulses passed by the discriminator will be applied to the count rate meter 47, which will indicate the rate at which the pulses are applied thereto and thus will indicate the intensity of gamma radiation due to oxygen activation at the detector 27. The neutron source 25 is left on until the value of oxygen activation at the detector 27 reaches a steady state level. This steady state level is recorded and the neutron source is then turned off. The time interval from the instant that the source is turned off until the instant that the last of the activated oxygen has flowed past the detector 27 is measured. This latter measurement provides an indication of the time it takes the activated oxygen to flow from the source 25 to the detector 27 and thus will provide a measurement of the linear flow rate of the water in the borehole.

If the linear flow rate is so slow that several half lives of activated oxygen elapse between the time that it is activated at the source 25 and the time that it passes by the detector 27, the system will not be effective to perform the desired measurements. In the case of such a slow flow rate, the pump control 43 is actuated to cause the motor 41 to drive the positive displacement pump 36 to pump a selected amount of liquid from the borehole 13 into the inflatable bag 31. Since the pump is a positive displacement pump, the servo-control 43 can be operated to control the motor 41 to drive the pump 36 so as to pump a precisely known amount of liquid into the inflatable bag 31. This will shorten the transit time for the fluid to pass from the source 25 to the detector 27 by an amount equal to the volume of liquid added to the inflatable bag 31 divided by the volumetric flow rate. For example, if the volumetric flow rate is one gallon per minute and the pump is controlled to add two gallons to the inflatable bag 31, the transit time from the source 25 to the detector 27 will be shortened by two minutes.

The utility of this method may be appreciated from the following explanation. The volumetric flow rate $R$ may be expressed by the equation.

$$R = V/T_1)$$

where $V$ is the volume of fluid in the borehole between the detector 27 and the source 25 and $T_1$ is the time required for this volume of fluid to move past the detector 27.

When the inflatable bag 31 is inflated with a volume of liquid $V_b$, an equal volume of fluid is displaced from the borehole. If fluid moves at the same rate, then the time required for the reduced volume to move past the detector will be correspondingly reduced. The equation then becomes $$R = V - V_b/T_2)$$

where $T_2$ is the time required for the reduced volume to move past the detector. If the rate is the same in both cases $$(V/T_1 = V - V_b/T_2)$$

or $$V = V_b T_1/T_1 - T_2) \text{ and } R = V_b/T_1 - T_2)$$

Thus $R$ the volumetric flow rate and $V$ the volume of the borehole can both be determined. From $V$, the volume of the borehole (between the source and detector) it is of course easy to calculate the diameter of the borehole, another useful parameter to measure.

The detector 29 positioned below the neutron source together with the pulse height discriminator 49 and the counting rate meter 51 serve to detect whether any of the oxygen activated by the source 25 flows downwardly from the source 25 as well as upwardly to the detector 27. Downward circulation from the source 25 would of course require a different interpretation of the measurements.

To obtain a production profile of the well, the instrument 15 is moved to incrementally increasing depths by the drum 19 and the measurements described above are taken at each depth. The amount of fluid in the inflatable bag 31 can be increased as slower flow rates are encountered throughout the well and thus measurements throughout the entire well can be obtained.

FIG. 3 illustrates a borehole apparatus 15' as an alternative embodiment of the present invention for biasing or affecting the volume of the borehole fluid between the source and detector, wherein two gamma ray detectors 60 and 61 are disposed on the same side of the neutron source 62. A fixed enlarged portion 63 of a known volume of the apparatus 15', having a greater diameter than the remainder of the instrument, provides a different displacement or volume of borehole fluid between the source 62 and detector 60 than between the detectors 60 and 61. With such an arrangement the linear velocity is measured at two points almost simultaneously. It will be recognized that the volumetric velocity will be the same at both points, i.e., at both of the uppermost detectors, but that the linear velocities will differ in a similar manner as previously described herein when the size of the instrument is sequentially different along the length of the instrument. The magnitude of the enlarged portion 63 may be chosen appropriately for the size of a particular borehole so that the optimum accuracy of flow velocity may be attained. It should be appreciated that such an apparatus as is illustrated in FIG. 3 produces a flow profile without the previously described pump and inflatable bag volume biasing configuration of FIG. 2.

A third gamma ray detector 64 placed below the neutron source 62 serves the same function as does the detector 29 described with respect to FIG. 2.

Although the measurements described herein above are primarily intended to be taken while the borehole apparatus is at rest, a flow profile may also be obtained while moving the instrument upward in the borehole provided the rate of movement of the apparatus is less rapid than that of the borehole fluid. When making a flow profile while moving the apparatus, the true flow rate is obtained by increasing the measured rate (as measured by the techniques herein described) by an amount equal to the volume of borehole traversed by the apparatus per unit time.

In the case of highly saline water instead of detecting oxygen activation, sodium and chlorine activation are detected in a similar manner. At flow rates too low for oxygen activation measurements, activation of still other materials in the borehole fluid could be used. These and many other modifications may be made to the above described specific embodiment of the invention without departing from the spirit and scope of the invention, which is defined in the appended claims.

The embodiments of the invention in which an exclusive property or privilege is claimed are defined as follows:

1. A system for measuring water production in a producing well by measuring the flow of borehole fluid between two points in an earth borehole, comprising:

a logging instrument adapted to be moved through said earth borehole to a position for a measurement;

a radioactive source mounted in said instrument for irradiating the borehole fluid at a first point in the borehole;

a radiation detector mounted in said instrument above said radioactive source for detecting the irradiated borehole fluid at a second point in the borehole;

inflatable bag means mounted on said instrument between said source and said detector that together with said logging instrument causes all fluid flowing in the borehole between said first point and said second point to flow between said inflatable bag and the wall of the borehole, said bag means being selectively inflatable to vary the transit time of the borehole fluid from the source to the detector in a controlled and predetermined manner; and pump means in said instrument for pumping a selected amount of borehole fluid into said bag for varying the transit time of the borehole fluid from the source to the detector in a controlled and predetermined manner.

2. The system according to claim 1 wherein said means to vary the transit time of the borehole fluid includes means on the earth's surface to control the length of transit time.

3. The system according to claim 2 wherein said pump means comprises a positive displacement pump connected to pump fluid into said inflatable bag.

4. A system according to claim 3 wherein said instrument comprises a casing containing said source and said detector and wherein said inflatable bag surrounds said casing and forms a fluid-tight seal with said casing.

5. A system as recited in claim 4 wherein a second radiation detector is mounted in said instrument below said radioactive source.

6. A system for measuring water production in a producing well comprising:
 a logging instrument adapted to be moved through an earth borehole;
 a radioactive source mounted in said instrument;
 a first radiation detector mounted in said instrument above said radioactive source;
 a second radiation detector mounted in said instrument above said first detector; and
 means on the exterior of said instrument which causes the linear velocity of borehole fluid between the level of said source and the level of said first detector to be different by a predetermined amount from the linear velocity of borehole fluid between the levels of said first and second detectors.

7. A system according to claim 6 wherein a third radiation detector is mounted in said instrument below said radioactive source.

8. The method of measuring the volumetric flow rate at a point in an earth borehole comprising the steps of:

measuring the time required for a volume of fluid equal to that between the level of a radioactive source and the level of a radioactive detector to move past a point in a borehole;
 changing the volume of fluid between said source level and said detector level by a predetermined amount; and
 measuring the time required for said changed volume to move past said point in the borehole, whereby the volume differential and the measured times provide an indication of the volumetric flow rate according to the relationship $$R = \Delta V/T_1 - T_2)$$

where $R$ is the volumetric flow rate, $\Delta V$ is the volume differential, $T_1$ is the initial time measurement and $T_2$ is the time measurement made with the changed volume.

9. The method according to claim 8 wherein the volume changing step comprises inflating the bag in the borehole between said source and said detector.

10. The method according to claim 9 wherein each of the time measurements comprises the detecting of activated oxygen moving between the level of said source and the level of said detector.

* * * * *